(12) United States Patent
Hao

(10) Patent No.: US 6,414,412 B1
(45) Date of Patent: Jul. 2, 2002

(54) VARIABLE SPEED MOTOR WITH TAPPED STARTING WINDING

(76) Inventor: Chung-Hsin Hao, No. 22-2, Sec. 2, Chang-An Rd., Hsi-Tun Dist., Taichung City (TW)

(*) Notice: Subject to any disclaimer, the term of this patent is extended or adjusted under 35 U.S.C. 154(b) by 0 days.

(21) Appl. No.: 09/642,099

(22) Filed: Aug. 21, 2000

(51) Int. Cl.[7] .............................. H02K 1/00; H02K 3/00; H02K 16/00; H02K 16/02; H02K 13/04; H02K 23/50; H02K 27/16; H02K 27/24; H02K 19/26; H02K 20/00; H02K 23/02

(52) U.S. Cl. .................... 310/200; 310/179; 310/189; 310/114; 310/134

(58) Field of Search ................. 310/179, 134, 310/208, 200

(56) References Cited

U.S. PATENT DOCUMENTS

| | | | | |
|---|---|---|---|---|
| 2,310,874 A | * | 2/1943 | Schiff | 172/278 |
| 3,114,094 A | * | 12/1963 | Lee | 318/238 |
| 3,633,057 A | * | 1/1972 | Smith | 310/184 |
| 4,737,701 A | * | 4/1988 | Hoemann et al. | 318/772 |
| 4,841,188 A | * | 6/1989 | Hao | 310/200 |
| 5,012,148 A | * | 4/1991 | Vithayathil | 310/165 |
| 5,049,801 A | * | 9/1991 | Potter | 318/785 |
| 5,111,095 A | * | 5/1992 | Hendershot | 310/168 |
| 5,134,332 A | * | 7/1992 | Nakamura et al. | 310/208 |
| 5,177,423 A | * | 1/1993 | Nakamura et al. | 318/767 |
| 5,254,894 A | * | 10/1993 | Satake et al. | 310/114 |
| 5,260,620 A | * | 11/1993 | Morrill | 310/185 |
| 5,825,111 A | * | 10/1998 | Fei | 310/179 |
| 6,008,560 A | * | 12/1999 | Becerra | 310/179 |
| 6,133,702 A | * | 10/2000 | Noble et al. | 318/158 |

* cited by examiner

Primary Examiner—Joseph Waks
Assistant Examiner—Julio C. Gonzalez
(74) Attorney, Agent, or Firm—Pillsbury Winthrop LLP

(57) ABSTRACT

A variable speed motor includes a motor body having an axis, and a plurality of coil mounting parts that extend radially and that are angularly spaced apart relative to the axis. A run coil is mounted on the coil mounting parts. A starting winding includes first, second and third speed-changing coils mounted on the coil mounting parts, a set of first taps provided respectively on two coil terminals of the first speed-changing coil, a set of second taps provided respectively on two coil terminals of the second speed-changing coil, and a set of third taps provided respectively on two coil terminals of the third speed-changing coil. Each of the first, second and third speed-changing coils spans an angular length relative to the axis that is substantially equal to that spanned by the run coil.

1 Claim, 6 Drawing Sheets

VARIABLE SPEED MOTOR WITH TAPPED STARTING WINDING

BACKGROUND OF THE INVENTION

1. Field of the Invention

The invention relates to a variable speed motor, more particularly to a variable speed motor with a tapped starting winding.

2. Description of the Related Art

Referring to FIGS. 1A and 1B, a variable speed motor for a ceiling fan in accordance with U.S. Pat. No. 4,841,188 is shown to include a motor body 5, a run coil 1, and a starting winding 2. The motor body 5, such as a stator, has an axis 510, and a plurality of coil mounting parts 511 that extend radially and that are angularly spaced apart relative to the axis 510, thereby forming a plurality of radial slots thereamong. The run coil 1 and the starting winding 2 are mounted on the coil mounting parts 511 of the motor body 5. As illustrated, the run coil 1 spans substantially all of the coil mounting parts 511 of the motor body 5. In addition, the coil mounting parts 511 are grouped into three adjacent clusters, each of which is spanned by a respective one of first, second and third speed-changing coils 205, 206, 207 of the starting winding 2. The starting winding 2 further includes a set of medium speed taps 203a, 203b, and a set of low speed taps 204a, 204b.

The run coil 1 has first and second coil terminals 101, 102, and is to be connected across an AC power source 4. The first speed-changing coil 205 has a first coil terminal 201, and a second coil terminal provided with one of the medium speed taps 203a. The second speed-changing coil 206 has a first coil terminal provided with the other one of the medium speed taps 203b, and a second coil terminal provided with one of the low speed taps 204a. The third speed-changing coil 207 has a first coil terminal provided with the other one of the low speed taps 204b, and a second coil terminal 202. A capacitor 3 connects the second coil terminal 202 of the third speed-changing coil 207 to the second coil terminal 102 of the run coil 1.

During high-speed operation of the motor, the first coil terminal 201 of the first speed-changing coil 205 is connected to the first coil terminal 101 of the run coil 1, the medium speed taps 203a, 203b interconnect the first and second speed-changing coils 205, 206 in series, and the low speed taps 204a, 204b interconnect the second and third speed-changing coils 206, 207 in series. As such, the series combination of the first, second and third speed-changing coils 205, 206, 207 and the capacitor 3 is connected in parallel to the run coil 1 and to the AC power source 4.

Referring to FIGS. 2A and 2B, during medium-speed operation of the motor, the medium speed tap 203a connects the second coil terminal of the first speed-changing coil 205 to the first coil terminal 101 of the run coil 1, while the other medium speed tap 203b connects the first coil terminal of the second speed-changing coil 206 to the first coil terminal 201 of the first speed-changing coil 205. The low speed taps 204a, 204b interconnect the second and third speed-changing coils 206, 207 in series. As such, the series combination of the second and third speed-changing coils 206, 207 and the capacitor 3 is connected in parallel to the series combination of the first speed-changing coil 205 and the run coil 1 and to the AC power source 4.

Referring to FIGS. 3A and 3B, during low-speed operation of the motor, the medium speed taps 203a, 203b interconnect the first and second speed-changing coils 205, 206 in series. The low speed tap 204a connects the second coil terminal of the second speed-changing coil 206 to the first coil terminal 101 of the run coil 1, while the other low speed tap 204b connects the first coil terminal of the third speed-changing coil 207 to the first coil terminal 201 of the first speed-changing coil 205. As such, the series combination of the third speed-changing coil 207 and the capacitor 3 is connected in parallel to the series combination of the first and second speed-changing coils 205, 206 and the run coil 1 and to the AC power source 4.

Due to the arrangement of the starting winding 2, the directions of current flow through the first, second and third speed-changing coils 205, 206, 207 can be maintained when changing between high-speed and medium-speed operations, and when changing between medium-speed and low-speed operations, thereby resulting in noise reduction.

During the medium-speed and low-speed operations of the motor, at least one of the first and second speed-changing coils 205, 206 is connected in series to the run coil 1. As such, the amounts of currents flowing through the first, second and third speed-changing coils 205, 206, 207 of the starting winding 2 tend to differ from each other during the medium-speed and low-speed operations. Because the first, second and third speed-changing coils 205, 206, 207 span only a respective cluster of the coil mounting parts 511 of the motor body 5, uniform magnetic line distribution at the coil mounting parts 511 can not be maintained during the medium-speed and low-speed operations of the motor, which can affect stability and balance, and which can arise in the generation of vibration and noise.

SUMMARY OF THE INVENTION

Therefore, the main object of the present invention is to provide a variable speed motor with a tapped starting winding that is capable of overcoming the aforesaid drawback of the prior art.

According to this invention, a variable speed motor comprises a motor body, a run coil and a starting winding. The motor body has an axis, and a plurality of coil mounting parts that extend radially and that are angularly spaced apart relative to the axis. The run coil is mounted on the coil mounting parts. The starting winding includes first, second and third speed-changing coils mounted on the coil mounting parts, a set of first taps provided respectively on first and second coil terminals of the first speed-changing coil, a set of second taps provided respectively on first and second coil terminals of the second speed-changing coil, and a set of third taps provided respectively on first and second coil terminals of the third speed-changing coil. Each of the first, second and third speed-changing coils spans an angular length relative to the axis that is substantially equal to that spanned by the run coil.

Preferably, each of the run coil and the first, second and third speed-changing coils of the starting winding spans substantially all of the coil mounting parts of the motor body.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1A:
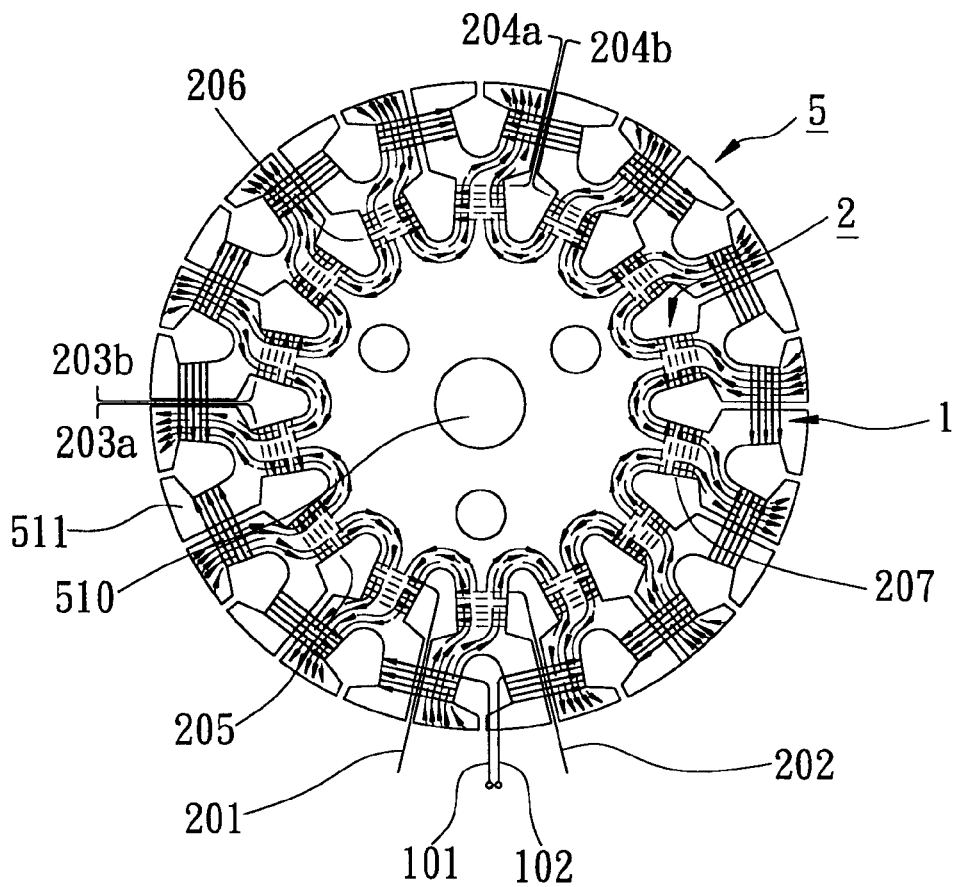
FIG. 1A illustrates the magnetic line distribution for a conventional variable speed motor during high-speed operation.
Figure 1B:
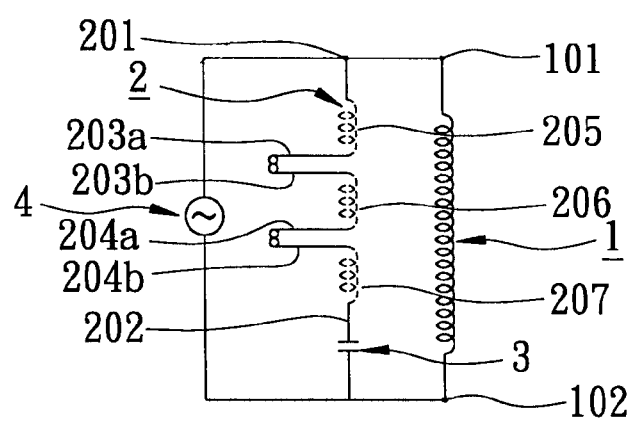
FIG. 1B is an electrical circuit diagram of the conventional variable speed motor during high-speed operation.
Figure 2A:
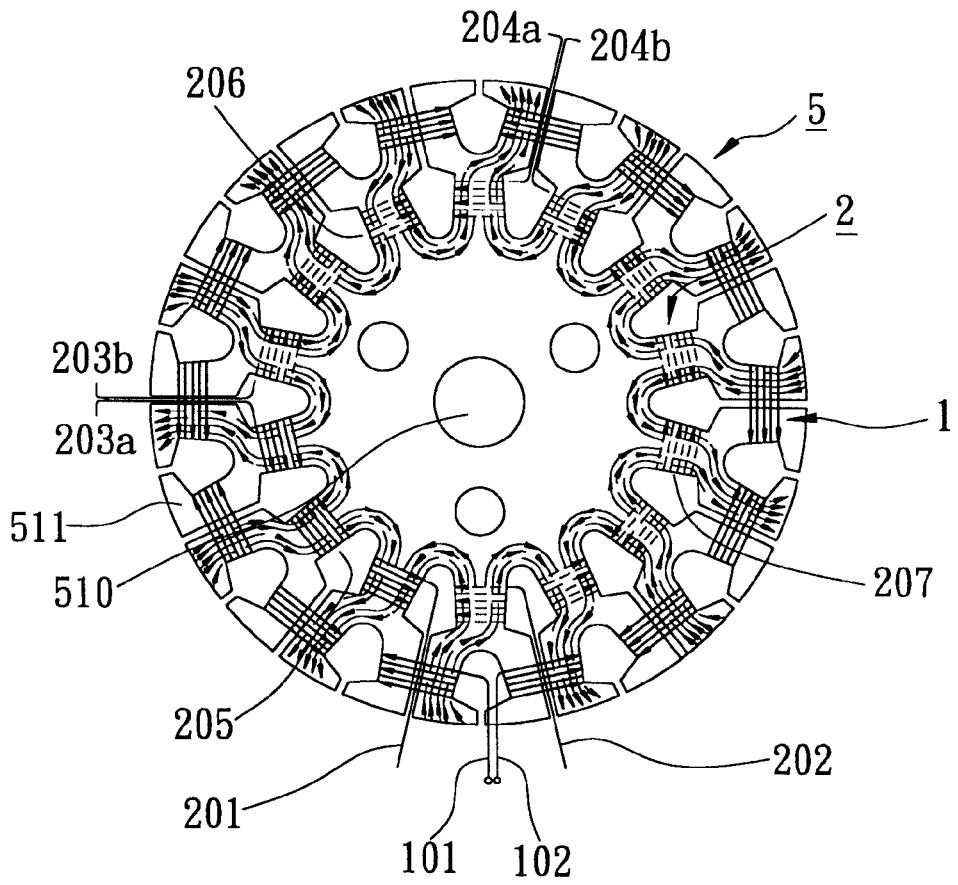
FIG. 2A illustrates the magnetic line distribution for the conventional variable speed motor during medium-speed operation.
Figure 2B:
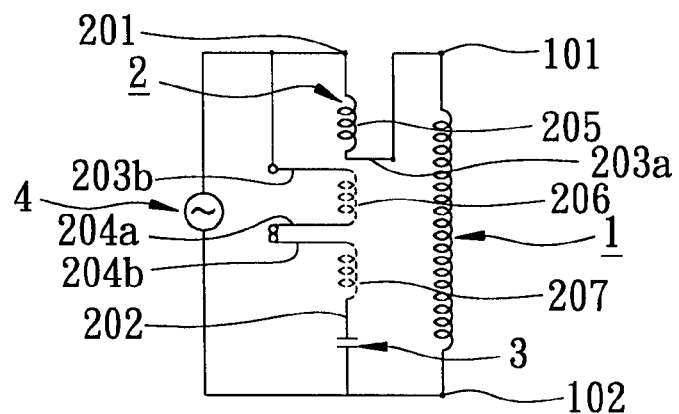
FIG. 2B is an electrical circuit diagram of the conventional variable speed motor during medium-speed operation.
Figure 3A:
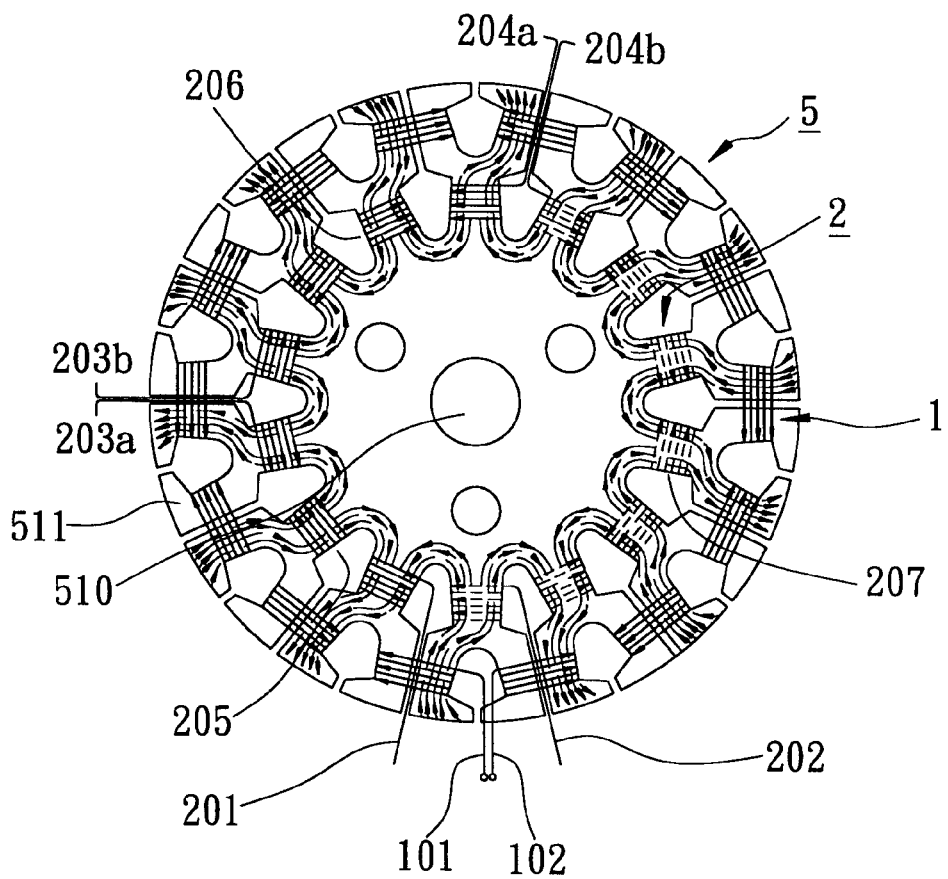
FIG. 3A illustrates the magnetic line distribution for the conventional variable speed motor during low-speed operation.
Figure 3B:
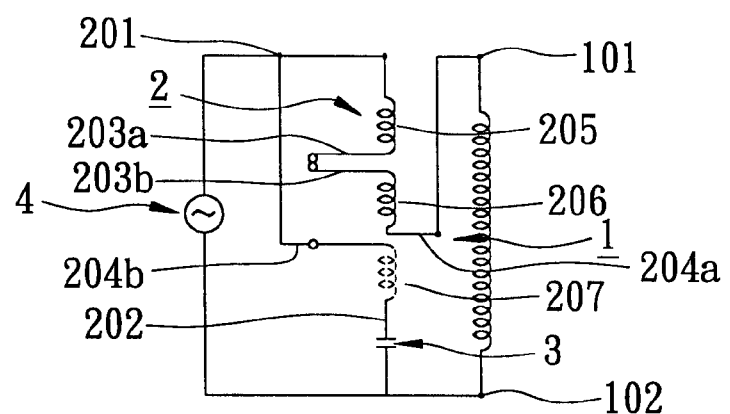
FIG. 3B is an electrical circuit diagram of the conventional variable speed motor during low-speed operation.
Figure 4A:
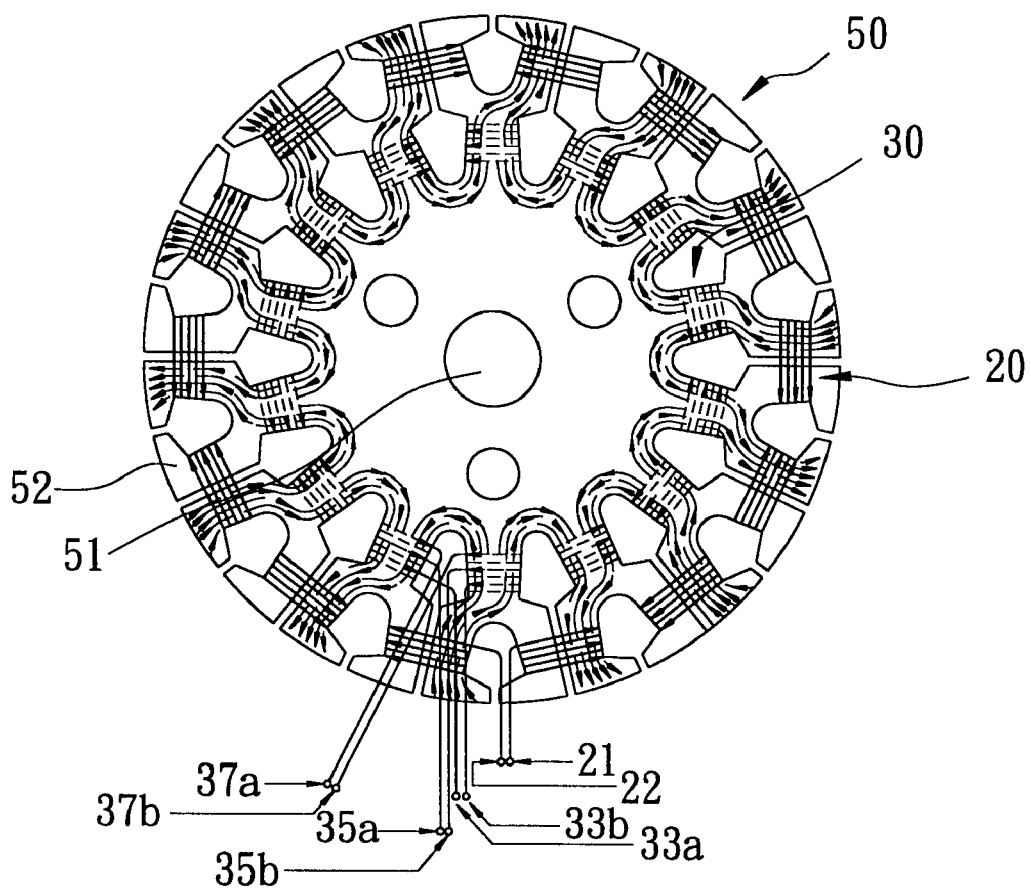
FIG. 4A illustrates the magnetic line distribution for the preferred embodiment of a variable speed motor according to this invention during high-speed operation.
Figure 4B:
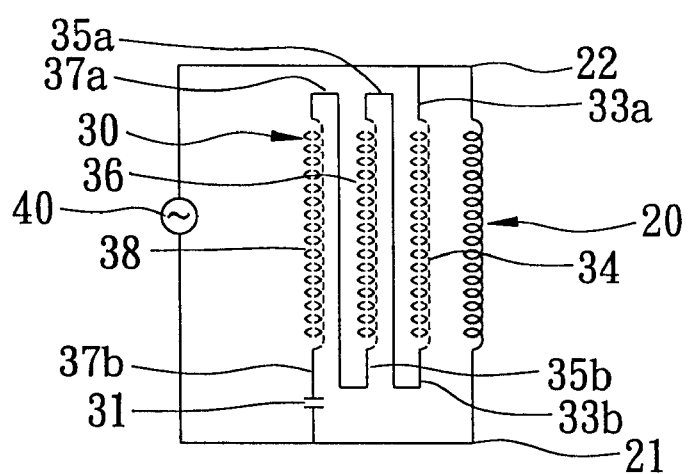
FIG. 4B is an electrical circuit diagram of the preferred embodiment during high-speed operation.

Referring to FIGS. 4A and 4B, the preferred embodiment of a variable speed motor according to this invention is shown to include a motor body 50, a run coil 20, and a starting winding 30. The motor body 50, such as a stator, has an axis 51, and a plurality of coil mounting parts 52 that extend radially and that are angularly spaced apart relative to the axis 51, thereby forming a plurality of radial slots thereamong. The run coil 20 and the starting winding 30 are mounted on the coil mounting parts 52 of the motor body 50. As illustrated, the run coil 20 spans substantially all of the coil mounting parts 52 of the motor body 50. Unlike the prior art described beforehand, each of first, second and third speed-changing coils 34, 36, 38 of the starting winding 30 spans an angular length relative to the axis 51 that is substantially equal to that spanned by the run coil 20. Particularly, each of the first, second and third speed-changing coils 34, 36, 38 also spans substantially all of the coil mounting parts 52 of the motor body 50. The starting winding 30 further includes a set of first taps 33a, 33b provided respectively on first and second coil terminals of the first speed-changing coil 34, a set of second taps 35a, 35b provided respectively on first and second coil terminals of the second speed-changing coil 36, and a set of third taps 37a, 37b provided respectively on first and second coil terminals of the third speed-changing coil 38. The run coil 20 has first and second coil terminals 22, 21, and is to be connected across an AC power source 40. A capacitor 31 connects the third tap 37b on the second coil terminal of the third speed-changing coil 38 to the second coil terminal 21 of the run coil 20.

During high-speed operation of the motor, the first tap 33a on the first coil terminal of the first speed-changing coil 34 is connected to the first coil terminal 22 of the run coil 20, the first tap 33b on the second coil terminal of the first speed-changing coil 34 is connected to the second tap 35a on the first coil terminal of the second speed-changing coil 36, and the second tap 35b on the second coil terminal of the second speed-changing coil 36 is connected to the third tap 37a on the first coil terminal of the third speed-changing coil 38. As such, the series combination of the first, second and third speed-changing coils 34, 36, 38 and the capacitor 31 is connected in parallel to the run coil 20 and to the AC power source 40.

Figure 5A:
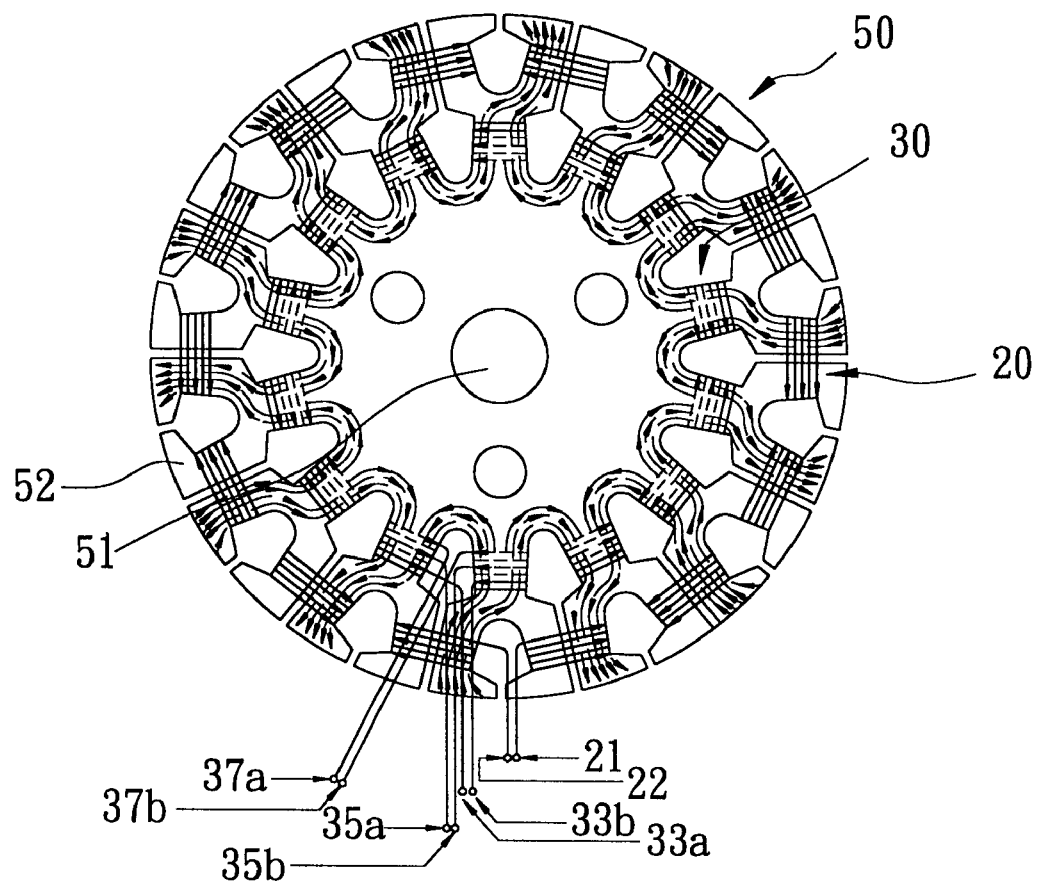
FIG. 5A illustrates the magnetic line distribution for the preferred embodiment during medium-speed operation.
Figure 5B:
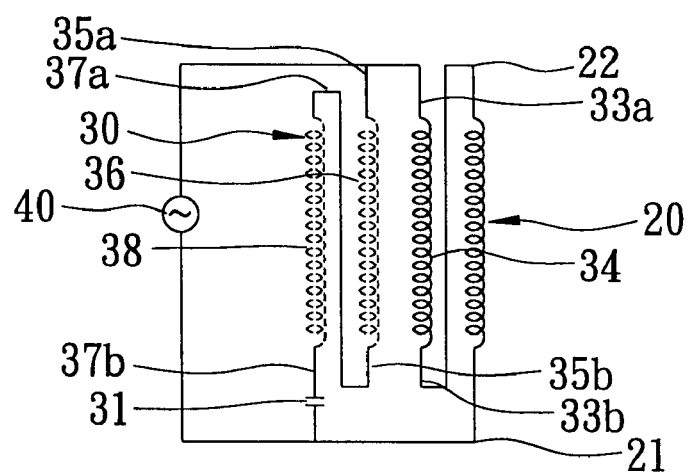
FIG. 5B is an electrical circuit diagram of the preferred embodiment during medium-speed operation.

Referring to FIGS. 5A and 5B, during medium-speed operation of the motor, the first tap 33b on the second coil terminal of the first speed-changing coil 34 is connected to the first coil terminal 22 of the run coil 20, the first tap 33a on the first coil terminal of the first speed-changing coil 34 is connected to the second tap 35a on the first coil terminal of the second speed-changing coil 36, and the second tap 35b on the second coil terminal of the second speed-changing coil 36 is connected to the third tap 37a on the first coil terminal of the third speed-changing coil 38. As such, the series combination of the second and third speed-changing coils 36, 38 and the capacitor 31 is connected in parallel to the series combination of the first speed-changing coil 34 and the run coil 20 and to the AC power source 40.

Figure 6A:
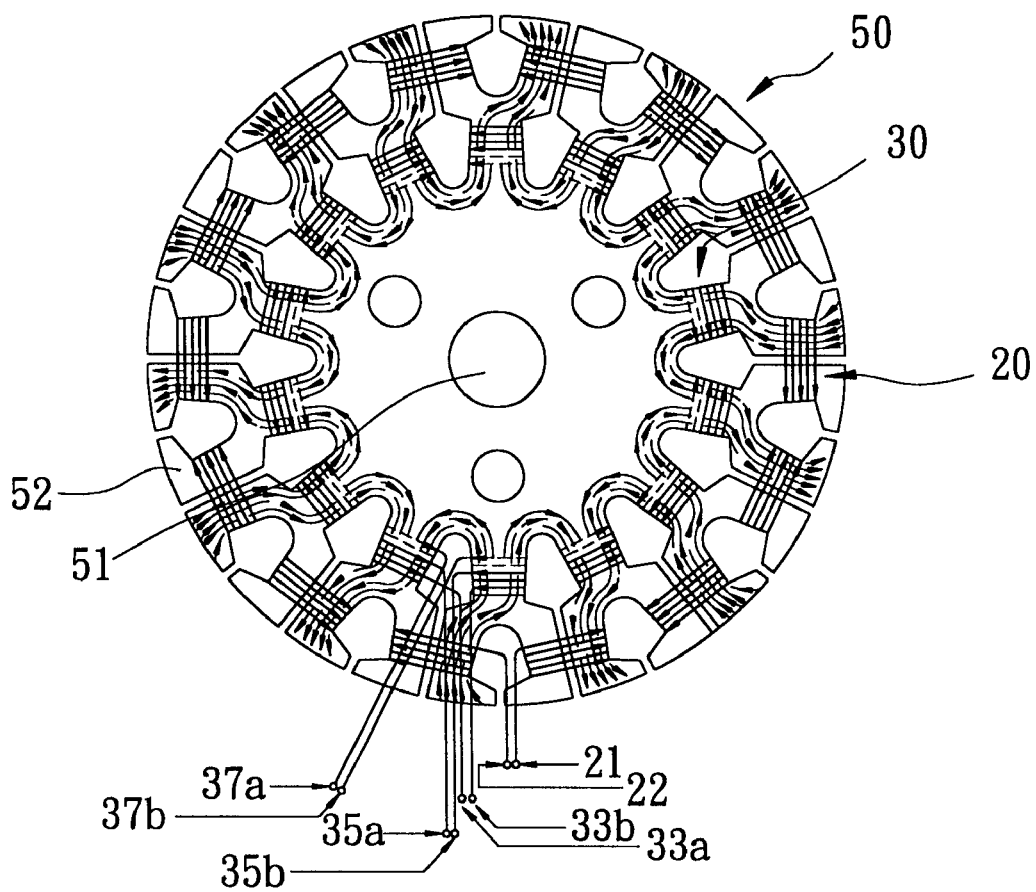
FIG. 6A illustrates the magnetic line distribution for the preferred embodiment during low-speed operation.
Figure 6B:
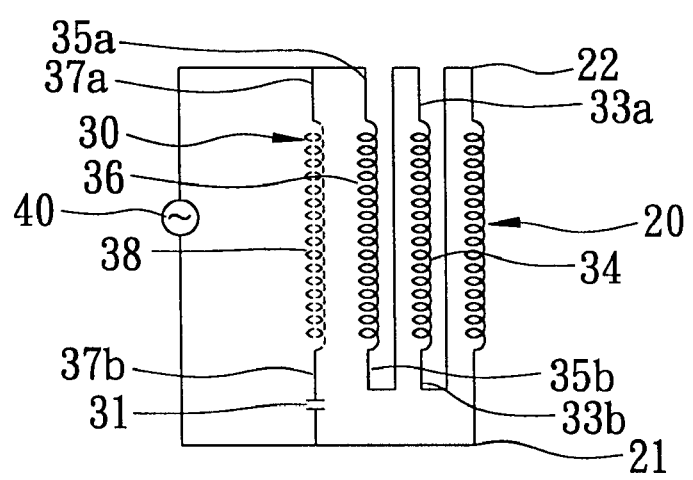
FIG. 6B is an electrical circuit diagram of the preferred embodiment during low-speed operation.

Referring to FIGS. 6A and 6B, during low-speed operation of the motor, the first tap 33b on the second coil terminal of the first speed-changing coil 34 is connected to the first coil terminal 22 of the run coil 20, the first tap 33a on the first coil terminal of the first speed-changing coil 34 is connected to the second tap 35b on the second coil terminal of the second speed-changing coil 36, and the second tap 35a on the first coil terminal of the second speed-changing coil 36 is connected to the third tap 37a on the first coil terminal of the third speed-changing coil 38. As such, the series combination of the third speed-changing coil 38 and the capacitor 31 is connected in parallel to the series combination of the first and second speed-changing coils 34, 36 and the run coil 20 and to the AC power source 40. Like the conventional variable speed motor described beforehand, due to the arrangement of the starting winding 30, the directions of current flow through the first, second and third speed-changing coils 34, 36, 38 can be maintained when changing between high-speed and medium-speed operations, and when changing between medium-speed and low-speed operations, thereby resulting in noise reduction. In addition, because each of the first, second and third speed-changing coils 34, 36, 38 spans substantially all of the coil mounting parts 52 of the motor body 50, uniform magnetic line distribution at the coil mounting parts 52 can be maintained regardless of the operating speed of the motor, thereby ensuring stability and balance, and preventing the generation of vibration and noise.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A variable speed motor comprising:
    a motor body having an axis, and a plurality of coil mounting parts that extend radially and that are angularly spaced apart relative to the axis;
    a run coil mounted on said coil mounting parts; and
    a starting winding including
       first, second and third speed-changing coils mounted on said coil mounting parts, each of said first, second and third speed-changing coils having first and second coil terminals, a set of first taps provided respectively on said first and second coil terminals of said first speed-changing coil, a set of second taps provided respectively on said first and second coil terminals of said second speed-changing coil, and a set of third taps provided respectively on said first and second coil terminals of said third speed-changing coil;

wherein each of said first, second and third speed-changing coils spans an angular length relative to said axis that is substantially equal to that spanned by said run coil, each of said run coil and said first, second and third speed-changing coils of said starting winding spans substantially all of said coil mounting parts of said motor body, said run coil has first and second coil terminals, and said starting winding further includes a capacitor that connects said third tap on said second coil terminal of said third speed-changing coil to said second coil terminal of said run coil, and during high-speed operation of said motor, said first tap on said first coil terminal of said first speed-changing coil is connected to said first coil terminal of said run coil, said first tap on said second coil terminal of said first speed-changing coil is connected to said second tap on said first coil terminal of said second speed-changing coil, and said second tap on said second coil terminal of said second speed-changing coil is connected to said third tap on said first coil terminal of said third speed-changing coil;

during medium-speed operation of said motor, said first tap on said second coil terminal of said first speed-changing coil is connected to said first coil terminal of said run coil, said first tap on said first coil terminal of said first speed-changing coil is connected to said second tap on said first coil terminal of said second speed-changing coil, said second tap on said second coil terminal of said second speed-changing coil is connected to said third tap on said first coil terminal of said third speed-changing coil, and a series combination of said second and third speed-changing coils is connected in parallel to a series combination of said first speed-changing coil and said run coil; and during low-speed operation of said motor, said first tap on said second coil terminal of said first speed-changing coil is connected to said first coil terminal of said run coil, said first tap on said first coil terminal of said first speed-changing coil is connected to said second tap on said second coil terminal of said second speed-changing coil, said second tap on said first coil terminal of said second speed-changing coil is connected to said third tap on said first coil terminal of said third speed-changing coil, and said third speed-changing coil is connected in parallel to a series combination of said first and second speed-changing coils and said run coil.

* * * * *